Patented Jan. 31, 1950

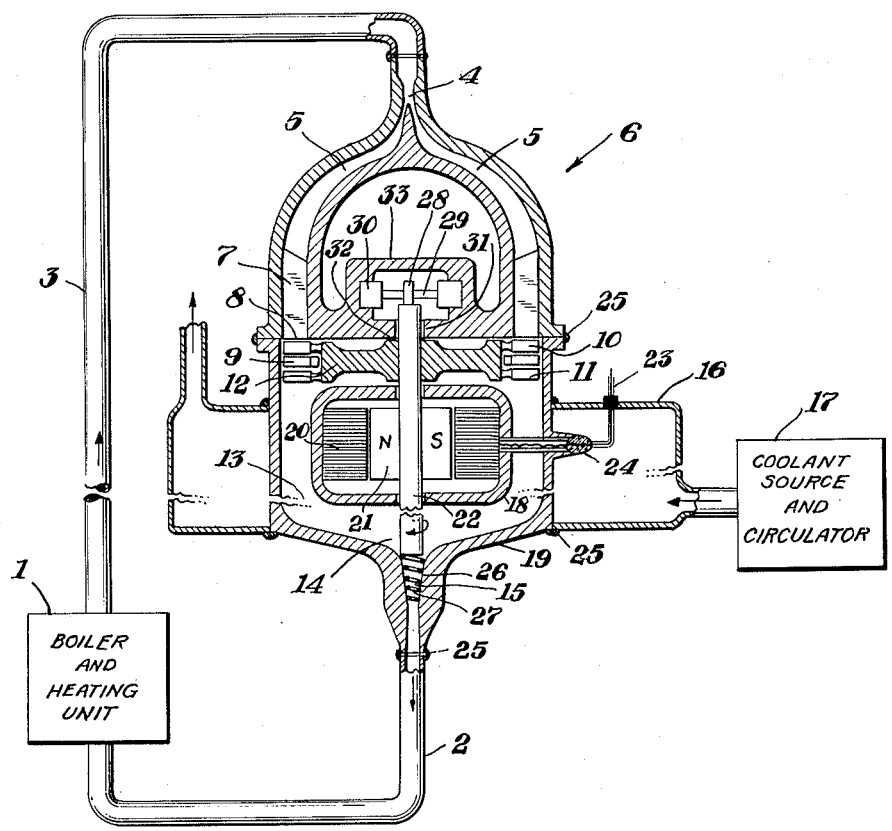

2,495,745

UNITED STATES PATENT OFFICE 2,495,745

SMALL TURBINE GENERATOR

Charles V. Litton, Redwood City, Calif., assignor to Federal Telephone and Radio Corporation, New York, N. Y., a corporation of Delaware Application February 20, 1946, Serial No. 649,065

3 Claims. (Cl. 290—52)

This invention relates to a turbine-generator, and, more specifically, to an improved combination of a mercury vapor turbine and electrical generator.

Dynamo and turbine combinations within a single sealed enclosure make realizable several important advantages, among which are increased efficiencies, compactness of the combined units, and the elimination of vapor seals between the dynamo and turbine. In small low power turbines, an important consideration is the influence of the ambient vapor on the friction losses of the wheel, and, when the rotor of a dynamo is also in the presence of such vapor, the losses are further increased. However, when reduced pressures may be employed while a high speed of expanded vapor is preserved together with a high thermodynamic efficiency, the mechanical structure of a turbo-generator becomes feasible. If mercury is utilized as the fluid whose vapor operates the turbine, it is possible to produce all of these conditions simultaneously.

A completely sealed mercury vapor turbine and generator combination enables the mecury and its vapor to flow in a closed cycle from a vaporizing unit or boiler to the turbine and past the turbine blades through a condensing arrangement, and back to the vaporizer. Systems of this type are very stable and efficient in operation and require a minimum of maintenance. The electrical system may comprise an alternator which has a permanent magnet rotor and a stator winding enclosed in a separate chamber internal to the turbine housing but not sealed against entry of mercury vapor therein. Electrical connections from the stator windings to external circuits may be made through vapor-tight glass seals in the turbine housing.

Additional problems, which this invention solves by improved arrangements, are encountered in seriously high bearing friction and in methods for forcing the condensed mercury from the turbine to the vaporizing unit. The present invention is directed primarily to systems wherein the turbine shaft is vertically positioned, and permits a reduction in friction encountered at the uppermost bearing through the use of a small bearing member mounted in a yieldable support and contacting the shaft at a location where the shaft diameter may be much reduced from the size encountered at other positions. Additional support for the shaft at times other than during operation of the turbine, for example when the apparatus is jarred in transit, may be obtained from a cooperating larger bearing located at another position along the shaft and having a clearance therefrom which prevents contact between this bearing and shaft except when the shaft is suddenly displaced from its normal axis of rotation.

Condensed mercury may be returned to the boiler by a gravity feed arrangement or may be forced back by a pumping system. The former cannot always be relied upon, and, in the interest of efficiency, a pump is required. This invention also provides a mercury pumping system internal to the turbine housing and serving simultaneously as a thrust bearing for the turbo-generator set. Contingent upon proper design considerations, the pumping and bearing system may be made to function as a fluid bearing arrangement also, wherein the mercury acts as a lubricant and additionally aids in relieving pressure of the turbine-generator set upon the thrust bearing.

It therefore becomes one object of the present invention to provide an improved turbine-generator and pump combination within a single small completely closed housing.

A second object is to provide an improved bearing system, for a turbine rotor revolving about a vertical axis, which offers a minimum of frictional resistance at an upper aligning bearing and in which the entire weight of the rotor is carried by a lower thrust bearing.

An additional object is to provide a combined turbine-generator-pump arrangement within a single vapor-sealed enclosure wherein a main thrust bearing also functions as a pumping system.

While this invention itself is defined in the appended claims, other objects, advantages and features thereof should become apparent and the foregoing discussion of the invention should be clarified by the following description of a preferred embodiment and from the accompanying drawing, in which the figure is a partially block diagram and partially sectional view of a complete system, according to this invention, for generating electric currents within a sealed mercury turbine.

Essentially, the action of the system shown in the embodiment is this: liquid mercury in a boiler is heated and converted to a vapor state, the vapor is introduced into the nozzle of a mercury turbine and caused to flow past the blades of the turbine rotor, thereby revolving the turbine rotor and an alternator rotor coupled thereto, the mercury vapor is then condensed due to the cooling action of a coolant which is circulated about a condenser section of the turbine enclosure, and the liquified mercury is pumped back to the boiler. In the figure, the preferred embodiment shows a boiler and heating unit, 1, supplied with liquid mercury through a conduit, 2. and delivering mercury vapor through a second conduit, 3, and a throat, 4, to the nozzle, 5, of the turbo-generator set, generally designated by the numeral, 6. The nozzle surface increases and changes to an annular substantially conic section; and a set of deflecting plates, 7, are positioned within the hollow section adjacent the nozzle aperture, 8. A second set of deflecting plates, 9, are also utilized to aid in directing the mercury vapor onto the two sets of rotating turbine blades, 10 and 11, attached to the turbine rotor, 12. After delivering power to the turbine blades, the mercury vapor enters the condensing chamber, 13, where it is cooled sufficiently to change to a liquid state. Thereafter, the liquid collects at the bottom of the chamber, 14, and is pumped back to the boiler through the conduit, 2, by the pumping arrangement, 15. Surrounding the housing adjacent the condensing chamber, 13, is another chamber, 16, through which a coolant is circulated by a circulator cooperating with a coolant source, the combination indicated by numeral 17.

An enclosure, 18, is positioned within the turbo-generator housing, 19, and surrounds an alternator stator winding, 20, and a permanent magnet rotor, 21, mounted upon the vertical shaft, 22, which also supports the turbine rotor, 12. Electrical connections, such as 23, may be made through the housing, 19, and may be made vapor-tight by means of glass seals, 24. Similarly, the housing sections, conduits, and coolant chamber may be sealed together by welds, 25.

The shaft, 22, which supports both the turbine rotor, 12, and the alternator rotor, 21, is positioned vertically and maintained along a desired axis of rotation by two bearing systems. The lower end of this shaft is frustro-conical in shape and is received in a similarly proportioned surface, 26, in the housing, 19. In addition to serving as a thrust bearing for the shaft, the frustro-conical receptacle cooperates with the shaft to provide a pumping system for the mercury collected at location 14. This is made possible by a spiral groove, 27, in the frustro-conical surface of the shaft. Rotation of the rotor shaft causes mercury to enter the groove and to be forcibly fed into conduit, 2. Provided that the pumping action is sufficiently forceful, there will be a reaction by the mercury upon the frustro-conical surface of the shaft which will tend to counteract the pressure of the shaft against the bearing surface. In addition to reducing the load on the thrust bearing when the shaft rotates, this system also permits the mercury to act as a lubricant between the shaft and bearing surfaces. A fluid type of bearing arrangement is thereby obtained.

At the upper shaft end, if smaller contact surface be desired, the shaft diameter may be reduced to form a spindle, 28. A bearing, 29, which has a small area of surface in contact with the spindle is positioned in a yieldable mount, 30, which allows some movement of the bearing but which by spring action tends to force the bearing and spindle to a position where the shaft is correctly aligned. The surface speed of the bearing is thus made small, and the contact area between spindle and bearing as well. Frictional effects at the upper bearing are hence considerably reduced. Since the spindle may be easily damaged, a constraining or limiting bearing, 31, is provided opposite a portion of the shaft which is more ruggedly constructed. The shaft can only be displaced a small distance before contacting the bearing 31 and so accidental shock movements of the turbo-generator combination will not cause the spindle to be damaged. As an additional precaution, the turbine rotor, 12, is positioned to contact the housing internal surface, 32, before the spindle can be damaged by contact with the bearing mount, 33, when longitudinal shaft movements occur.

It should be apparent that the turbo-generator pump combination may be changed considerably by those skilled in the art without departing from the principles of this invention as disclosed by the foregoing objects and the discussion of the particular embodiment shown. There are undoubtedly many turbine and dynamo combinations which would permit mercury to be condensed and collected at positions where thrust bearings might be made to additionally function as pumping means, even conceivably with the rotor shaft revolving about a horizontal axis. It is necessary that the reduced friction alignment bearing be employed as the upper bearing of a vertical shaft since it is not intended to be subject to very great radial or longitudinal thrusts. The yieldable mount for this bearing may be any type of spring construction or a mounting of resilient material.

Therefore, while the present invention has been described and illustrated in connection with a single preferred embodiment, it should be clearly understood that this has been done only by way of example and is not to be considered as limiting the scope of the invention.

I claim:

1. A mercury turbine-electric generator-mercury pump combination, comprising a vapor-sealed housing, a mercury turbine with rotor shaft in said housing rotatable about a substantially vertical axis, an electric generator internal to the vapor-sealed housing of said turbine and driven by said rotor shaft, conducting means electrically coupling said generator to external circuits through said housing, reservoir means internal to said housing for collecting mercury condensed therein, a combination lower thrust bearing system and mercury pump internal to said housing, and a yieldable alignment bearing and limiting bearing combination for positioning the upper end of said rotor shaft.

2. A mercury turbine-electric generator-mercury pump combination according to claim 1 wherein said combination lower thrust bearing system and mercury pump comprises a tapered and spirally grooved end portion of said rotor shaft cooperating with a close-fitting bearing receptacle for said end portion, whereby mercury from said reservoir is forced through said groove when said rotor shaft rotates.

3. A mercury turbine-electric generator-mercury pump combination according to claim 1 wherein said yieldable alignment bearing and limiting bearing combination comprises a bearing which is positioned around a reduced-diameter section of said rotor shaft, a yieldable mounting for said bearing supported by said housing, and a large area limiting bearing normally separated from said shaft and positioned opposite a section of said shaft which is not reduced in diameter.

CHARLES V. LITTON.

REFERENCES CITED

The following references are of record in the file of this patent:

UNITED STATES PATENTS

| Number | Name | Date |
|---|---|---|
| 525,390 | McElroy | Sept. 4, 1894 |
| 548,930 | Sargent | Oct. 29, 1895 |
| 1,804,694 | Jones | May 12, 1931 |
| 1,845,430 | Marti | Feb. 16, 1932 |
| 1,928,525 | Etheridge | Sept. 26, 1933 |
| 2,015,905 | Marti | Oct. 1, 1935 |